United States Patent Office 2,972,581
Patented Feb. 21, 1961

2,972,581
CORROSION INHIBITOR COMPOSITION AND COOLING SOLUTION

Carl E. Johnson, Westchester, Ill., and Louis E. Hummel, Santa Monica, Calif., assignors to Nalco Chemical Company, a corporation of Delaware No Drawing. Filed Sept. 21, 1955, Ser. No. 535,746

9 Claims. (Cl. 252—75)

This invention relates to corrosion inhibitors, noncorrosive liquids and methods for inhibiting corrosion. More particularly, the invention relates to compositions and methods for the prevention of corrosion in heat exchange devices employing aqueous solutions, and it finds important application in the prevention of corrosion in diesel engine and automotive cooling systems.

When the diesel electric locomotives were first introduced, very little consideration was given to the water treatment with the result that severe deterioration of the cooling systems occurred in a period as short as a few months. Major overhauls were required after a period of only eighteen months. Failures occurred in engine frames due to stress corrosion, radiators became plugged with corrosion products, and erosion corrosion caused rapid penetration of liners with a resultant leakage of cooling water into the crankcase.

These conditions rapidly brought the seriousness of the problem to the fore, with the result that numerous solutions to the problem and treatments of all types were used for a time. With continued service experience, only the chromate base inhibitors were found generally satisfactory, and acceptance of this type of inhibitor grew. However, even with the general adoption of chromates, all problems were not solved.

Some types of equipment were subject to severe cavitation erosion attack, so that dosages of inhibitors effective for most applications were not effective for controlling this type of attack. With continued development, it was found that satisfactory life and performance of these parts could be obtained by increasing the chromate concentration in the cooling water and maintaining the pH in the range of from 9.0 to 9.5. In some cases aluminum used in oil coolers and radiator headers was severely attacked. A sodium chromate-sodium nitrate combination was developed which gave good results in protecting aluminum even when coupled with brass. The pH of this treatment was maintained in the pH range of 7.5 to 8.0.

However, chromate inhibitors, while finding extensive use, suffer from a number of disadvantages. Although cavitation and erosion attack has been controlled, as indicated above, and aluminum attack has been reduced, the optimum conditions for each type of attack are usually different. Consequently, a blend of the conditions is employed, with the result that aluminum corrosion continues, although considerably reduced.

Chromates are also not recommended for use with antifreeze materials, particularly ethylene glycols. The chromates have apparently caused deleterious effects on some lubricating oils where water contamination has occurred.

One problem is that of complaints the railroads receive of dermatitis by workers handling or coming in contact with chromate inhibitors or solutions, or parts that were in contact with the chromate inhibitors. There has been an urgent need of a non-hazardous, non-dermatitis producing diesel cooling system treatment.

Another important factor is that chromates are in short supply in periods of national emergency, so that their availability for use in corrosion inhibition applications cannot always be assured.

The problem of adequate corrosion protection of a diesel cooling system is complex. There are areas of high and low velocities. Narrow interstices are numerous. Several different metals are used of widely different behavior. For example, the metals used in one system which are in contact with the cooling water are the following:

(1) Galvanized steel plate
(2) Bronze
(3) Copper
(4) Cast iron
(5) Stainless steel
(6) Steel
(7) Aluminum
(8) Tin
(9) Lead
(10) Silver Non-metal components are:

(1) Carbon
(2) Synthetic rubber (silicone)
(3) Neoprene
(4) Asbestos gaskets
(5) Natural rubber An ideal corrosion inhibitor for a diesel cooling system in addition to protecting the many metals and non-metal parts should pass the following requirements:

(1) Should be non-scale forming.
(2) Should not form sludge.
(3) Should not induce foaming in the recirculating cooling water.
(4) Should be compatible with antifreeze compounds and effect good corrosion protection in their presence.
(5) Should be chemically stable so that continued use in a system under operating conditions will not cause deterioration and a consequent decrease in effectiveness.
(6) Should not cause harmful effects when mixed with lubricating oils, since in some cases leakage of cooling water through seals into the crankcase can occur.
(7) Should be non-hazardous to personnel.
(8) Should be economical to use.
(9) As nearly as possible, the dosage should not be critical, so that it will function with a variety of service conditions of water hardness, dissolved solids, temperature, velocity, pH value and other variables encountered.
(10) Should lend itself to simple analysis for ease of control.
(11) Should not build up objectionable deposits in exhaust ports in cases where leakage of the cooling water might occur.
(12) Solubility characteristics should be such that no problems are encountered in making up solutions of desirable concentration either in solution vats or in the cooling system itself.

The chromate treatments have not been entirely satisfactory in all these regards.

A very useful corrosion inhibiting composition which overcomes the foregoing disadvantages is disclosed in copending application of Green and Boies, Serial Number 490,694, filed February 25, 1955, now U.S. Patent Number 2,815,328, patented December 3, 1957, and this composition is now in extensive use in diesel engine cooling systems where it has proven to be eminently satisfactory. In certain applications, however, it is desirable to improve the properties of the composition. Thus, while the composition is widely added directly to the cooling system in its use concentration, that is, very dilute, certain applications require that a concentrated solution first be made up, and the concentrate be then supplied from a feeder located at a strategic point in a railroad system.

It is therefore an object of this invention to provide a new and improved corrosion inhibiting composition and method.

It is a particular object to overcome the disadvantages accompanying the use of chromate inhibitors.

Another particular object is to provide a corrosion inhibitor composition which is highly soluble and which is substantially completely dissolved in aqueous solutions at high concentrations.

A further object is to provide a composition which is not substantially hygroscopic.

An important object is to provide compositions and methods especially advantageous for the inhibition of corrosion of aluminum, while preventing corrosion of other metals normally encountered.

Another object is to provide compositions and methods useful in preventing corrosion due to aqueous anti-freeze solutions.

An additional object is to provide compositions which produce no deleterious effects on lubricating oils and on radiator hose and the like.

A further object is to provide compositions and methods which avoid the industrial hazards previously encountered in connection with the use of inhibitor compositions.

Further objects include the provision of compositions and methods which provide the above-listed desired results. These and other objects and advantages of the invention will be apparent from the following description.

In accordance with the invention, there is now provided a corrosion inhibitor composition of a compound selected from the group consisting of mercaptobenzothiazole and alkali metal salts thereof, an alkali metal silicate, an alkali metal nitrite, and an alkali metal metaborate. In one useful embodiment, an alkali metal thiosulfate is also provided in the composition.

The new composition is adapted to provide in an aqueous solution thereof an alkali metal salt of mercaptobenzothiazole, an alkali metal silicate, an alkali metal nitrite, and an alkali metal metaborate. The composition when added to water or an aqueous anti-freeze solution in turn provides an anti-corrosion solution which is very effective for inhibiting corrosion of metals caused by contact with such a liquid, particularly in heat exchange devices, and it finds especially advantageous application in the cooling system of a diesel electric locomotive.

There is also provided by the invention a method of inhibiting corrosion of metal due to contact with aqueous liquid which involves contacting the metal with the liquid in the presence of an alkali metal salt of mercaptobenzothiazole, an alkali metal silicate, an alkali metal nitrite, and an alkali metal metaborate. A further method of inhibiting corrosion involves incorporating the foregoing compounds in an aqueous heat transfer liquid which is supplied to a heat exchange device or the like.

The new composition furnishes the desired good corrosion protection and other advantages, and it is very soluble and not hygroscopic. According to the aforementioned copending application, an alkali metal nitrate is an essential component of the composition. In achieving the objects of the present invention, however, it has been found that the nitrate can and should be omitted. It has been found that comparable corrosion protection is then achieved if the alkali metal silicate be present in a proportion of at least about 7% and the alkali metal nitrite be present in a proportion of at least about 20%. It is further required that the borate be an alkali metal metaborate. Employing these conditions, the objects of the invention are attained.

The new composition may be incorporated in the liquid by mixing in solution vats or in the cooling system, and it is especially advantageous for making up a concentrated solution of the inhibitor, e.g., 15%, preferably 20% or greater, and as high as 35%. The inhibitor composition may be supplied to the user in the form of an aqueous concentrate, or it may be supplied as a powder, in granular form or in unit dosage form such as tablets. The solid compositions can be added to a feeder tank in high concentrations, and they go into solution rapidly and substantially completely. A small amount of material may fail to dissolve, but it is insufficient to affect the properties of the solution and it goes into solution at use concentrations.

While a salt of mercaptobenzothiazole may be incorporated in the composition intended for subsequent addition to an aqueous liquid, the acid form is preferably employed. In the resulting alkaline solution, the compound is present as an alkali metal salt.

In the description following and in the claims, the proportions set forth are given with reference to a particular compound of each class described. When another compound of the class is to be employed instead of that compound, an equivalent proportion of the other compound is calculated by determining the amount of the latter required to give the same concentration of the anion, since the activity of the composition is due to the anion content. Where the anion may take several forms, as in the silicates, the anion concentration is calculated on the basis of the content of the parent oxide, i.e., $SiO_2$.

Mercaptobenzothiazole is preferably present in the composition designed for addition to liquid in an amount equivalent to at least about 3% by weight of the ingredients employed in accordance with the invention. The preferred range of concentration is about 3–15% and about 5–8% appears to be optimum.

An alkali metal silicate, preferably a metasilicate, is provided in the composition in a relatively small amount equivalent to at least about 7% by weight of sodium metasilicate pentahydrate. A concentration within the range of about 7–15% is preferred, and about 7–10% is further preferred. Water soluble alkali metal silicates other than sodium metasilicate can be employed to provide the equivalent amounts of soluble silica.

An alkali metal nitrite is provided in a relatively large amount equivalent to at least about 20% by weight of sodium nitrite. The concentration may range from about 20% to about 50%, with about 25–35% being preferred.

It has been found to be advantageous at times to provide an alkali metal thiosulfate in the composition in an amount equivalent to up to about 15% by weight of sodium thiosulfate, preferably 4–15%. This ingredient provides a useful function in promoting the solubilization of the composition.

A relatively large amount of an alkali metal metaborate is preferably employed. Preferably, sodium metaborate is provided in the composition, which may be in the form of a hydrate, such as the tetrahydrate

$(Na_2B_2O_4 \cdot 4H_2O)$

The borate is provided in an amount equivalent to at least about 20% by weight of sodium metaborate tetrahydrate, and as high as about 85%. A relatively large amount of about 40–70% is preferred, and about a major proportion is further preferred.

The metaborate is combined with the other ingredients in a proportion which will provide a pH of about 8.5–10.5 in the ultimate aqueous solution in the cooling system. In the provision of this pH, it is preferred that the initial pH of the composition be relatively high, i.e., about 10–10.5, because the pH decreases in use. In making up the concentrated solutions, the resulting pH will be at its highest, for example, about 10.5, and it may even be somewhat higher. It is often advantageous to raise the pH of the concentrated solution to preferably 11, or 11.5, such as by adding a small amount of sodium hydroxide. This additional alkalinity is provided to neutralize the carbonic acid due to the carbon dioxide of the air which is absorbed on standing.

Although the sodium salts of the compounds employed in the invention are preferred because of their lesser cost, potassium and lithium salts may be employed. Ammonium salts, however, are not suitable when the composition is used in a system in which the aqueous medium contacts copper or copper alloys because of the corrosive action of ammonium salts on such alloys under alkaline conditions.

It is to be understood that the inhibitory activity resides in the anions present and that the preference for alkali metal salts, and sodium salts in particular, is based primarily on considerations of cost and solubility. Alkaline earth metal salts are generally insufficiently soluble or react in solution with other components of the composition or water to form insoluble compounds.

To preclude foaming, which may otherwise be encountered, a minor, effective amount of an antifoam may also be included in the composition. Ordinarily, only a fractional percent need be employed. A preferred antifoam is described in British application No. 22,771/47, August 15, 1947, and comprises an intimate mixture of an inorganic aerogel and a methyl siloxane polymer having perceptible rubbery characteristics and containing an average of from 1.75 to 2 carbon atoms per atom of silicon. Such a composition is commercially available under the name Dow-Corning Antifoam A, and it is effective in an amount less than about 0.1% by weight, ordinarily at about 0.03%.

A dye may be included in the composition, to render the aqueous liquid to which the composition is added more easily visible in the sight glass of a cooling system. Advantageously, an indicator dye such as phenolphthalein is included, so that the pH of the solution can be ascertained visually.

The new composition for addition to an aqueous liquid, to produce an anti-corrosion solution, thus includes minor, effective amounts of an alkali metal salt of mercaptobenzothiazole or the free acid, an alkali metal silicate, and an alkali metal nitrite. An effective amount of an alkali metal metaborate is also included. Preferably, the borate is provided in a proportion such that a pH of about 8.5–10.5 obtains in the ultimate solution. A minor amount of an alkali metal thiosulfate may also be included, and a very small amount of anti-foam may be incorporated.

The foregoing composition is incorporated in water or an aqueous solution, such as a solution of water and a non-electrolyte freezing point depressant, for example, methanol, ethanol, ethylene glycol, glycerol, and the like. At least about 0.3 oz. of the composition, having reference only to the ingredients comprising the invention, is incorporated in each gallon of liquid. The composition is ordinarily added in an amount of about 0.3–3 oz. per gallon, or about 0.225–2.25% by weight of the liquid based on a liquid specific gravity of 1. Preferably at least about 0.75 oz. per gallon is added, and at least 1.0 oz. per gallon is further preferred for best aluminum protection.

The preferred relative concentration ranges of the ingredients of the composition intended for addition to an aqueous liquid and the corresponding preferred concentration ranges in the resulting anti-corrosion solution, based on a liquid specific gravity of 1, are thus as follows:

| Compound | Conc'n in composition Percent By weight | Conc'n in liquid, Percent by weight |
|---|---|---|
| Mercaptobenzothiazole | 3–15 | .006–0.3 |
| Sodium metasilicate pentahydrate | 7–15 | 0.015–0.3 |
| Sodium nitrite | 20–50 | 0.045–1.1 |
| Sodium metaborate tetrahydrate | 20–85 | 0.04–1.9 |
| Sodium thiosulfate | up to 15 | up to 0.3 |
| Antifoam | 0.03–0.1 | 0.0000675–0.00225 |

The values are based on the specific compounds listed and are adjusted correspondingly when other forms of the ingredients as regards the cations, anions, and amount of hydration are used. Thus, for example, if a potassium salt is employed instead of the sodium salt, a greater amount is used corresponding to the greater atomic weight of potassium: e.g., instead of 20% of sodium nitrite (M.W. 69), 25% of potassium nitrite (M.W. 85.1) is used to supply the same concentration of the nitrite anion. It will be apparent that greater concentrations may be employed in various applications; however, there ordinarily appears to be no need for more.

In evaluating the new corrosion inhibitor compositions, they were tested in most instances by three methods, referred to as A, B, and C. Test Method A represents a polymetallic electrically coupled system in contact with a type of water likely to be used in diesel engines. Test Method B represents an idealized system in which the metals are not in contact (uncoupled or insulated) and the water used is initially free of all dissolved solids. Test Method C is designed to duplicate conditions in a diesel cooling system.

TEST METHOD A

APPARATUS

The test was run in a wide mouth 1 liter flask, equipped with a reflux condenser and an aeration tube. The aeration tube was made of 2 mm. glass tubing, and was surrounded by a glass chimney to prevent impingement of the air on the specimens. The specimen assembly was supported in the solution by hooks of Nichrome wire. The flask was immersed in an oil bath at the desired temperature.

TEST SOLUTION

Test solutions were made up in a corrosion test water consisting of one part Chicago, Illinois tap water to one part distilled water, with 10 grains of sodium chloride added per gallon. One liter of solution was used, and the temperature was maintained at 180° F.

SPECIMENS

The specimens used were picked for their similarity to metals used in diesel cooling systems. The specifications for each specimen, and the methods of preparation and cleaning were as follows:

(a) *Brass.*—The brass specimens consisted of a strip 1 in. by 1½ in. by ¹⁄₁₆ in., with a ³⁄₆₄ in. mounting hole near one shorter edge. The composition is given by specification SAE 70 grade C. Preparation before testing was accomplished by polishing with No. 2/0 emery paper, and then washing with Bab-O cleanser. After the test, prior to reweighing, the specimen was cleaned with toluene, dipped in muriatic acid inhibited with 5% formaldehyde for 15 seconds, dipped in saturated sodium carbonate solution, and washed and dried. The average cleaning loss was 0.2 mg.

(b) *Copper.*—The copper specimen consisted of a strip 1 in. by 1½ in. by ¹⁄₁₆ in., conforming to specifications ASTM B133–47T. Preparation before testing and cleaning prior to reweighing were the same as for brass. The average cleaning loss was 0.3 mg.

(c) *Solder.*—The solder specimen consisted of a piece of either 8 or 10 B. & S. gauge solid solder, having a surface area of 0.14 sq. dm. One end was flattened and a 5/32 in. mounting hole drilled. The composition of the solder was 30 percent tin and 70 percent lead, SAE grade 3A. The specimen was bent in the form of a loop. Before the test, the specimen was cleaned with toluene. After the test the specimen was washed with Bab-O. Average cleaning loss was 0.5 mg.

(d) *Aluminum.*—The aluminum specimens were of two types. In some tests they were made from cast strips of Alcoa 319 alloy. The specimens were milled to 1 in. by 1½ in. by 3/16 in., and polished with oiled No. 1/0 emery paper, degreased with toluene, and dried. They were mounted by means of a 9/64 in. hole near one edge.

In other tests the specimens were made from cast aluminum rod containing 5 percent silicon. The specimens were 5 in. long and 3/16 in. diameter and bent in the form of a loop. Before forming, the specimens were polished with No. 1/0 and 2/0 emery paper impregnated with paraffin.

After the test, both types of specimens were cleaned by immersion at 180° F. for 10 minutes in a solution containing 5 percent phosphoric acid and 2 percent chromic oxide by weight. Average cleaning loss was 0.2 mg.

(e) *Cast Iron Liner.*—The cast iron specimens were supplied by the American Locomotive Company, and were cut from a diesel cylinder liner. The specimens were approximately 1 in by 2 in. by 3/8 in., with a 9/64 in. hole drilled near one shorter edge. If the inner wall was chrome-plated, the plating was removed by milling. The ferrous specimens were cleaned before and after a test by a 30 second immersion in inhibited muriatic acid, followed by a dip in saturated sodium carbonate solution, and then washed and dried.

PROCEDURE

After preparation, the specimens were weighed, and then mounted on a 6-32 brass screw, separated about 1/8 in. by conical brass washers, so that they were in electrical contact. The assembly was then placed in the test solution at 180° F. After one week, the specimens were removed, cleaned and reweighed, as described above. The extent of corrosion was determined by weight loss and/or visual examination.

TEST METHOD B

The apparatus was the same as used in Method A. The test solution was distilled water.

The specimens were brass, copper, aluminum and cast iron, as described in Method A, and radiator tube. The latter specimen was a piece 1½ in. long cut from diesel radiator tubing made of brass (85% copper, 15% zinc) coated with tin. Cleaning procedures, before and after the test, were those described in Method A. The radiator tube was cleaned by the procedure used for solder in Method A.

The specimens were insulated from each other by suspending them on a glass rod with rubber spacers. The solutions were aerated at 180° F. for one week, removed, cleaned and reweighed. Corrosion was determined by weight loss and/or visual examination.

TEST METHOD C

Water was circulated by means of a centrifugal pump from a 5 gal. glass reservoir through 50 feet of ¼ in. copper tubing, then through a 3-foot length of 9/16 in., 20 gauge, cold drawn seamless steel tubing, and back to the reservoir. The steel tube was heated by means of several Bunsen burners to maintain an effluent temperature of 180° F., thus providing a heat transfer surface. The copper tubing coil served to radiate heat. Flow through the system was approximately 0.4 gal./min. The copper coil and the steel tube were in electrical contact.

Specimens of the type used in Method A were suspended in the reservoir, in contact, as described in that method. The test solution and cleaning procedures were those of Method A. After the test, which lasted one week, the specimens were cleaned and reweighed to determine weight loss. Corrosion and scale formation were determined at the heat transfer surfaces by cutting the tube on a diagonal, and observing that part of the tube which was directly over the flame.

The following examples illustrate the invention, but it is to be understood that the invention is not limited thereto nor to the particular compositions, proportions and procedures therein, which are given only for purposes of illustration.

*Example 1*

The following corrosion inhibitor composition according to the invention was tested for its effectiveness in equal parts by volume of ethylene glycol and water, and it was compared with a commercial inhibited composition of the same glycol diluted with the same water. The test methods were A, B, and C, as described above except for the presence of glycol in the solutions, and the water was that described in Test Method A in each case.

| Ingredient | Parts by weight |
|---|---|
| Sodium metaborate tetrahydrate ($Na_2B_4O_7 \cdot 4H_2O$) | 49.3 |
| Sodium metasilicate pentahydrate | 7.5 |
| Sodium thiosulfate | 7.5 |
| Sodium nitrite | 30.0 |
| Mercaptobenzothiazole | 5.0 |
| Antifoam [1] | 0.7 |
| Phenolphthalein | 0.15 |

[1] 1 part Dow Corning Antifoam A and 19 parts sodium carbonate.

A concentrated aqueous solution of this composition was prepared by first dissolving the alkali metal thiosulfate in water and then adding each of the remaining ingredients separately with good agitation. One part of the total solids of the composition was thus dissolved in two parts by weight of water to provide a 33% solution of the composition. This concentrate was then added in varying proportions to the glycol-water mixture for test purposes.

The results of the tests are shown in Table I, listing the results of the flask tests by Methods A and B, and in Table II, listing the results of the recirculating test of Method C. In the tables, the above composition is identified as inhibitor I, and the commercial inhibited composition is identified as A.

The amount of corrosion may be classified in four classifications suggested by McKay and Worthington, "Corrosion Resistance of Metals and Alloys," Reinhold Publishing Co., N.Y., 1936, p. 102, namely:

(1) No corrosion
(2) Very slight corrosion
(3) Intermediate corrosion
(4) Serious corrosion The corrosion rates are reported in the tables in mils per year (m.p.y.), and the following charts relate the corrosion rates to the above corrosion classifications:

| Corrosion Rate | Cast Iron, m.p.y. | Aluminum, m.p.y. | Copper, m.p.y. |
|---|---|---|---|
| 1 | 0–0.18 | 0–0.53 | 0–0.16 |
| 2 | 0.18–1.83 | 0.53–5.29 | 0.16–1.61 |
| 3 | 1.83–18.3 | 5.29–52.9 | 1.61–16.1 |
| 4 | Over 18.3 | Over 52.9 | Over 16.1 |

| Corrosion Rate | Brass, m.p.y. | Solder, m.p.y. | Tin (Radiator tube), m.p.y. |
|---|---|---|---|
| 1 | 0–0.17 | 0–0.16 | 0–0.20 |
| 2 | 0.17–1.70 | 0.16–1.59 | 0.20–1.97 |
| 3 | 1.70–17.0 | 1.59–15.9 | 1.97–19.7 |
| 4 | Over 17.0 | Over 15.9 | Over 19.7 |

Such considerations as the nature of the attack, whether general or localized, the thickness of the metal concerned, and the type of part, whether of critical dimensions or not, all serve to modify the interpretation, so that the above chart furnishes only a general guide.

TABLE I

| Test No. | 1 | 2 | 3 | 4 | 5 | 6 | 7 | 8 | 9 |
|---|---|---|---|---|---|---|---|---|---|
| Inhibitor | A | I | I | I | I | I | I | I | I |
| Conc. (fl. oz./gal.) | | 1 | 2 | 4 | 8 | 1 | 2 | 4 | 8 |
| Test method | A | A | A | A | A | B | B | B | B |
| Initial pH | 7.6 | 9.2 | 9.7 | 10.0 | 10.3 | 9.6 | 9.9 | 10.1 | 10.4 |
| Final pH | 7.6 | 8.8 | 9.1 | 9.5 | 10.1 | 9.0 | 9.3 | 9.6 | 10.0 |
| Metal Corrosion Rate, m.p.y.: | | | | | | | | | |
| Aluminum | 8.2 | 21.7 | 8.0 | 0.8 | (¹) | 0.5 | 0.3 | (¹) | (¹) |
| Cast iron | 0.2 | 0.4 | 0.2 | 0.4 | 0.3 | 0.4 | 0.3 | 0.2 | 0.1 |
| Brass | 1.0 | 0.3 | 0.3 | 0.3 | 0.3 | 0.2 | 0.2 | 0.1 | 0.3 |
| Copper | 1.9 | 0.5 | 0.7 | 0.8 | 0.6 | 1.8 | 0.8 | 1.0 | 0.7 |
| Solder | 3.4 | 0.2 | 0.5 | | 0.1 | | | | |
| Radiator tube | | | | | | 0.2 | 0.0 | (¹) | 0.0 |

¹ Indicates weight gain.

The composition was prepared in three forms, powder, granular and pellets. The powder was prepared by mixing the ingredients and grinding in a mortar and pestle. The granular material was prepared by adding 10% of water to the powder, stirring until a uniform solid mixture was obtained, and then allowing to dry in the atmosphere for several days. The pellets or tablets were prepared from the granules in a pelleting machine at 2000 p.s.i. The corrosion protection afforded by the composition

TABLE III

| Test No. | 13 | 14 | 15 | 16 | 17 | 18 | 19 | 20 | 21 | 22 |
|---|---|---|---|---|---|---|---|---|---|---|
| Inhibitor Conc., oz./gal | 0.3 | 0.3 | 0.4 | 0.4 | 0.5 | 0.5 | 0.75 | 0.75 | 1.5 | 1.5 |
| Test method | A | B | A | B | A | B | A | B | A | B |
| Initial pH | 9.8 | 10.0 | 9.7 | 9.7 | 10.1 | 10.2 | 10.0 | 10.2 | 10.4 | 10.4 |
| Final pH | 9.3 | 9.1 | 9.4 | 9.1 | 9.2 | 9.2 | 9.2 | 9.2 | 9.4 | 9.4 |
| Metal Corrosion Rate (m.p.y.): | | | | | | | | | | |
| Aluminum | 11.1 | 17.9 | 7.6 | 16.0 | 6.3 | 0.2 | 6.0 | 0.5 | 4.6 | 0.5 |
| Cast iron | 0.6 | 0.3 | 0.6 | 0.4 | 0.6 | 0.3 | 0.3 | 0.3 | 0.3 | 0.3 |
| Brass | 0.6 | 0.5 | 0.6 | 0.4 | 0.3 | 0.3 | 0.3 | 0.3 | 0.3 | 0.3 |
| Copper | 1.0 | 0.8 | 0.5 | 1.2 | 0.4 | 0.9 | 0.7 | 0.9 | 0.6 | 0.8 |
| Solder | 2.1 | | 0.4 | | 0.1 | | 1.3 | | 0.9 | |
| Radiator tubing | | 0.2 | | 0.3 | | 0.1 | | 0.2 | | 0.5 |

TABLE II

| Test No. | 10 | 11 | 12 |
|---|---|---|---|
| Inhibitor | I | I | I |
| Conc. (fl. oz./gal.) | 2 | 2 | 2 |
| Test method | C | C | ª CI |
| Metal Corrosion Rate, m.p.y.: | | | |
| Aluminum | 6.0 | | 0.4 |
| Cast iron | 0.0 | 0.2 | 1.3 |
| Brass | 0.3 | 0.5 | 0.4 |
| Copper | 0.6 | 0.8 | 1.2 |
| Solder | 0.5 | (ᵇ) | |
| Radiator tube | | | 0.3 |

ª Specimens insulated.
ᵇ Specimen suffered physical damage in handling.

It will be noted that the new composition effectively inhibited corrosion due to the glycol-water solution, and the protection was superior to the commercial composition for copper, brass and solder. In the test with the commercial inhibited composition, especially severe pitting attack was noted on the solder.

Composition I has been tested over a period of time at a concentration of from 0.9 to 2 fluid ounces of the aqueous concentrate per gallon in the cooling systems of a number of diesel locomotives, and excellent results have been obtained. Corrosion has been controlled very well in cylinder heads and liners, and on the aluminum headers. No deposits have been noted.

*Example 2*

The following composition, referred to as II, was tested for corrosion protection in water according to Test Methods A, B and C.

| Ingredient | Parts by weight |
|---|---|
| Sodium metaborate ($Na_2B_2O_4 \cdot 4H_2O$) | 55.8 |
| Sodium metasilicate pentahydrate | 7.5 |
| Sodium nitrite | 30.0 |
| Mercaptobenzothiazole | 6.0 |
| Antifoam | 0.7 |
| Phenolphthalein | 0.15 | was evaluated using the pellet form of the composition, and the results are shown in Tables III and IV following.

TABLE IV

| Test No. | 23 | 24 | 25 |
|---|---|---|---|
| Inhibitor Conc. (oz./gal.) | 0.75 | 0.75 | 0.75 |
| Test method | C | C | *CI |
| Metal Corrosion Rate, m.p.y: | | | |
| Aluminum | 19.2 | | 18.2 |
| Cast Iron | 0.5 | 0.7 | 0.4 |
| Brass | 0.5 | 0.6 | 0.6 |
| Copper | 0.6 | 0.6 | 0.8 |
| Solder | 0.8 | 0.7 | |
| Radiator tubing | | | 0.9 |

*Specimens insulated.

The results indicate that satisfactory corrosion protection on cast iron as well as brass, copper, solder and radiator tubing, is obtained at a dosage level as low as 0.3 oz. per gal. For best aluminum protection, the dosage should be at least about 1 oz. per gal., although a lower level may prove to be satisfactory. The results of the recirculating test shown in Table IV are quite satisfactory for this type of test.

*Example 3*

Corrosion inhibitor II described in Example 2 was comparatively tested for solubility with a preferred composition according to the aforementioned copending application identified as B and having the following ingredients:

| Ingredient | Parts by weight |
|---|---|
| Sodium nitrite | 20.0 |
| Sodium nitrate | 20.0 |
| Sodium metasilicate pentahydrate | 6.3 |
| Mercaptobenzothiazole | 6.0 |
| Sodium tetraborate pentahydrate | 47.0 |
| Antifoam ¹ | 0.7 |

¹ Same as in Example 1.

The solubilities were compared at room temperature and at several concentrations. The fraction of each composition which did not dissolve and/or which came out of solution is indicated in Table V.

TABLE V

| Inhibitor | II | B |
|---|---|---|
| Conc., Percent | Insol. Fraction, Percent | |
| 5 | 0.0 | ca 10 |
| 15 | 0.0 | ca 30 |
| 20 | 0.2 | |
| 25 | 0.4 | |

The results show that the new composition has a much greater solubility than the prior composition, and that it is very suitable for preparing concentrated solutions on the order of 15% or greater. The material which does not dissolve or which comes out of solution when the new composition is used, is fluffy, has a low density and does not cling to the vessel. Upon dilution to the normal use concentration, the material goes into solution.

The new composition is non-scale forming, is non-foaming, does not form sludge, is non-hazardous to personnel, and does not adversely affect the various non-metallic materials in the cooling systems, such as the rubber parts and gaskets.

There is thus provided by the invention new compositions and methods very effective in the inhibition of corrosion in cooling systems, particularly in diesel engine cooling systems. The compositions are much superior to the prior chromate inhibitors, especially in the protection of aluminum. They also solve the problems of solubility in high concentration. The compositions are useful alike in water and in aqueous antifreeze solutions. They are well adapted to transportation, storage and incorporation in the cooling systems, and they can be introduced into the cooling water in whichever of the several different methods of addition is the most desirable from the operational standpoint, especially in the form of a concentrated solution from a feeder.

The invention is hereby claimed as follows:

1. A corrosion inhibitor composition consisting essentially of, in percentages by weight, about 3–15% of a compound selected from the group consisting of mercaptobenzothiazole and alkali metal salts thereof, about 7–15% of an alkali metal silicate calculated as sodium metasilicate pentahydrate, about 20–50% of an alkali metal nitrite calculated as sodium nitrite, and about 20–85% of an alkali metal metaborate calculated as sodium metaborate tetrahydrate.

2. A corrosion inhibitor composition consisting essentially of, in percentages by weight, about 3–15% of a compound selected from the group consisting of mercaptobenzothiazole and alkali metal salts thereof, about 7–15% of an alkali metal silicate calculated as sodium metasilicate pentahydrate, about 20–50% of an alkali metal nitrite calculated as sodium nitrite, about 4–15% of an alkali metal thiosulfate calculated as sodium thiosulfate, and about 20–85% of an alkali metal metaborate calculated as sodium metaborate tetrahydrate.

3. A corrosion inhibitor composition consisting essentially of, in percentages by weight, about 5–8% of a compound selected from the group consisting of mercaptobenzothiazole and alkali metal salts thereof, about 7–10% of an alkali metal silicate calculated as sodium metasilicate pentahydrate, about 25–35% of an alkali metal nitrite calculated as sodium nitrite, and about 40–70% of an alkali metal metaborate calculated as sodium metaborate tetrahydrate.

4. A corrosion inhibitor composition consisting essentially of, in percentages by weight, about 3–15% of mercaptobenzothiazole, about 7–15% of sodium metasilicate calculated as the pentahydrate, about 20–50% of sodium nitrite, and about 20–85% of sodium metaborate calculated as the tetrahydrate.

5. A cooling solution for internal combustion engines consisting essentially of water and a corrosion inhibitor composition of, in percentages by weight of the cooling solution, about 0.006–0.3% of an alkali metal salt of mercaptobenzothiazole, about 0.015–0.3% of an alkali metal silicate calculated as sodium metasilicate pentahydrate, about 0.045–1.1% of an alkali metal nitrite calculated as sodium nitrite, and about 0.04–1.9% of an alkali metal metaborate calculated as sodium metaborate tetrahydrate, said solution being at a pH of 8.5–10.5.

6. An anti-freeze cooling solution for internal combustion engines consisting essentially of water, a miscible alcohol and a corrosion inhibitor composition of, in percentages by weight of the cooling solution, about 0.006–0.3% of an alkali metal salt of mercaptobenzothiazole, about 0.015–0.3% of an alkali metal silicate calculated as sodium metasilicate pentahydrate, about 0.045–1.1% of an alkali metal nitrite calculated as sodium nitrite, and about 0.04–1.9% of an alkali metal metaborate calculated as sodium metaborate tetrahydrate, said sodium being at a pH of 8.5–10.5.

7. A concentrated solution for dilution to provide a cooling solution for internal combustion engines consisting essentially of water and about 15% to 35% by weight of a composition of, in percentages by weight, about 3–15% of a compound selected from the group consisting of mercaptobenzothiazole and alkali metal salts thereof, about 7–15% of an alkali metal silicate calculated as sodium metasilicate pentahydrate, about 20–50% of an alkali metal nitrite calculated as sodium nitrite, and about 20–85% of an alkali metal metaborate calculated as sodium metaborate tetrahydrate.

8. A concentrated solution for dilution to provide a cooling solution for internal combustion engines consisting essentially of water and about 15% to 35% by weight of a composition of, in percentages by weight, about 3–15% of a compound selected from the group consisting of mercaptobenzothiazole and alkali metal salts thereof, about 7–15% of an alkali metal silicate calculated as sodium metasilicate pentahydrate, about 20–50% of an alkali metal nitrite calcuated as sodium nitrite, about 4–15% of an alkali metal thiosulfate calculated as sodium thiosulfate, and about 20–85% of an alkali metal metaborate calculated as sodium metaborate tetrahydrate.

9. A concentrated solution for dilution to provide a cooling solution for internal combustion engines consisting essentially of water and about 15% to 35% by weight of a composition of, in percentages by weight, about 3–15% of a compound selected from the group consisting of mercaptobenzothiazole and alkali metal salts thereof, about 7–15% of an alkali metal silicate calculated as sodium metasilicate pentahydrate, about 20–50% of an alkali metal nitrite calculated as sodium nitrite, about 4–15% of an alkali metal thiosulfate calculated as sodium thiosulfate, and about 20–85% of an alkali metal metaborate calculated as sodium metaborate tetrahydrate, said concentrated solution being at a pH of 10–11.5.

References Cited in the file of this patent

UNITED STATES PATENTS

| | | |
|---|---|---|
| 1,822,449 | Nonamaker | Sept. 8, 1931 |
| 2,373,570 | Keller | Apr. 10, 1945 |
| 2,411,676 | Burghart | Nov. 26, 1946 |
| 2,534,030 | Keller | Dec. 12, 1950 |
| 2,815,328 | Green et al. | Dec. 3, 1957 |

UNITED STATES PATENT OFFICE
CERTIFICATION OF CORRECTION

Patent No. 2,972,581            February 21, 1961

Carl E. Johnson et al.

It is hereby certified that error appears in the above numbered patent requiring correction and that the said Letters Patent should read as corrected below.

Column 12, line 27, for "sodium" read -- solution --.

Signed and sealed this 22nd day of August 1961.

(SEAL)
Attest:

ERNEST W. SWIDER
Attesting Officer

DAVID L. LADD
Commissioner of Patents